United States Patent
Christenson et al.

(10) Patent No.: US 9,246,873 B2
(45) Date of Patent: *Jan. 26, 2016

(54) CLIENT-DRIVEN LOAD BALANCING OF DYNAMIC IP ADDRESS ALLOCATION

(71) Applicant: International Business Machines Corporation, Armonk, NY (US)

(72) Inventors: David A. Christenson, Fergus Falls, MN (US); James Venuto, Poughkeepsie, NY (US)

(73) Assignee: International; Business Machines Corporation, Armonk, NY (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/707,624

(22) Filed: Dec. 7, 2012

(65) Prior Publication Data

US 2013/0166754 A1 Jun. 27, 2013

Related U.S. Application Data

(63) Continuation of application No. 13/334,112, filed on Dec. 22, 2011.

(51) Int. Cl.
*H04L 12/28* (2006.01)
*H04L 29/12* (2006.01)
*H04L 29/08* (2006.01)
*H04L 29/06* (2006.01)

(52) U.S. Cl.
CPC ...... *H04L 61/2015* (2013.01); *H04L 29/06047* (2013.01); *H04L 61/20* (2013.01); *H04L 67/1004* (2013.01); *H04L 67/1008* (2013.01); *H04L 67/1023* (2013.01); *H04L 67/1036* (2013.01)

(58) Field of Classification Search
CPC . H04L 61/20; H04L 61/2015; H04L 61/2061; H04L 67/1002; H04L 67/1004; H04L 67/1008; H04L 67/1023; H04L 67/1029
See application file for complete search history.

(56) References Cited

U.S. PATENT DOCUMENTS

| | | | |
|---|---|---|---|
| 5,938,732 A | 8/1999 | Lim et al. | |
| 6,078,960 A | 6/2000 | Ballard | |
| 6,205,477 B1 * | 3/2001 | Johnson et al. | 709/220 |
| 7,068,597 B1 | 6/2006 | Fijolek et al. | |
| 7,987,228 B2 * | 7/2011 | McKeown et al. | 709/202 |
| 2002/0078188 A1 * | 6/2002 | Anand et al. | 709/222 |
| 2003/0126252 A1 | 7/2003 | Abir | |
| 2003/0163341 A1 | 8/2003 | Banerjee et al. | |
| 2005/0108431 A1 * | 5/2005 | Park | 709/245 |

(Continued)

OTHER PUBLICATIONS

Christenson et al.: "Client-Driven Load Balancing of Dynamic IP Address Allocation"; U.S. Appl. No. 13/334,112, filed Dec. 22, 2011.

(Continued)

*Primary Examiner* — Aaron Strange
(74) *Attorney, Agent, or Firm* — Patterson & Sheridan, LLP (57) ABSTRACT

Techniques are described for load balancing between DHCP servers at a DHCP client. Embodiments receive load information from each of two or more DHCP servers. Here, the load information describes a current workload of the respective DHCP server from which the load information is received. One of the two or more DHCP servers is then selected at the DHCP client based on the received load information. Additionally, embodiments accept an IP address offer from the selected DHCP server.

7 Claims, 5 Drawing Sheets

(56) References Cited

U.S. PATENT DOCUMENTS

| | | | |
|---|---|---|---|
| 2006/0224773 | A1 | 10/2006 | Degenaro et al. |
| 2008/0084877 | A1* | 4/2008 | Brzozowski ............... 370/389 |
| 2009/0019164 | A1* | 1/2009 | Brown et al. ............... 709/227 |
| 2009/0222583 | A1 | 9/2009 | Josefsberg et al. |
| 2013/0067095 | A1* | 3/2013 | Kruse et al. ............... 709/227 |
| 2013/0166748 | A1 | 6/2013 | Christenson et al. |

OTHER PUBLICATIONS

Droms et al., Internet Draft "DHCP Failover Protocol", Mar. 2003, pp. 1-133 <http://tools.ietf.org/html/draft-ietf-dhc-failover-12>.

Droms, "Dynamic Host Configuration Protocol", Mar. 1997, pp. 1-41. <http://www.ietf.org/rfc/rfc2131.txt>.

Alexander et al., "DHCP Options and BOOTP Vendor Extensions RFC2132", Last Updated Mar. 2, 2013, pp. 1-34 <https://datatracker.ietf.org/doc/rfc2132/>.

"dhcp-options(5)—Linux man page", The Internet Systems Consortium DHCP Distribution was written by Ted Lemo under contract with Vixie Labs, pp. 1-26. <http://linux.die.net/man/5/dhcp-options>.

Droms, "Procedure for Defining New DHCP Options", Jan. 1999, pp. 1-5 <http://www.ietf.org/rfc/rfc2489.txt>.

dhcpd-leases(5): "DHCP Client Lease Database—Linux man page", The Internet Systems Consortium dhcpd(8) was written by Ted Lemon under contract with Vixie Labs, pp. 1-6. <http://linux.die.net/man/5/dhcpd.leases>.

Volz et al., "DHC Load Balancing Algorithm", Feb. 2001, pp. 1-9 <http://www.ietf.org/rfc/rfc3074.txt>.

Internet Systems Consortium, "dhcpd.conf (5) File Formats Manual", pp. 1-49. <http://www.daemon-systems.org/man/dhcpd.conf.5.html>.

Internet Systems Consortium, "dhclient.conf—DHCP Client Configuration File", pp. 1-13 <http://www.daemon-systems.org/man/dhclient.conf.5.html>.

* cited by examiner

CLIENT-DRIVEN LOAD BALANCING OF DYNAMIC IP ADDRESS ALLOCATION

CROSS-REFERENCED TO RELATED APPLICATIONS

This application is a continuation of co-pending U.S. patent application Ser. No. 13/334,112, filed Dec. 22, 2011. The aforementioned related patent application is herein incorporated by reference in its entirety.

BACKGROUND

Embodiments presented in this disclosure generally relate to computer networking and, more particularly, to techniques for load balancing between DHCP servers at a DHCP client.

Internet Protocol (IP) addresses are used to designate the destination of IP communications. An IP address serves a purpose for network communications similar to a street address for postal mail. In order for a device (or node) connected to an IP network to communicate over the network with another node through an Internet Protocol, each node must have an IP address and each node must reference the IP address of the other node. Further, each node must be configured such that it is capable of determining a route to each other node with which it wishes to communicate. The IP address configuration information can be used to determine routes to other nodes for the purposes of communication form an IP Configuration for a node.

There are several methods to provide a node on a network with an IP Configuration. A node new to the network or which has been set to a factory default state may have a well known default IP configuration. For example, such a node could come preconfigured to use an address on a non-routable network. Alternatively, the IP network may utilize a Dynamic Host Configuration Protocol ("DHCP") server. The DHCP server may have available a pool of IP addresses and may assign an address from the pool to the node for a session on the IP network. In this case, a DHCP Client on the node must be configured to accept an IP address from a DHCP server. As another alternative, some combination of DHCP and default configuration may be used to assign a node an IP Configuration.

Generally, DHCP gives network administrators a method to facilitate automatic distribution of addresses and to maintain the network configuration in a central location. More specifically, DHCP is an application-layer protocol that allows a client machine on a network to exchange packets between a software daemon on the client (i.e., a DHCP client) with another on a DHCP server (i.e., a DHCP server application) to get an IP address. The DHCP server may lease the IP address to clients for some period of time, after which the lease of the IP address will expire. In such a scenario, the DHCP clients may have the option of renewing the lease of the IP address for an additional period of time. Additionally, such a period of time may be an infinite timeframe, such that the assigned IP address for the client remains the same without requiring renewal.

SUMMARY

Embodiments provide a method, system and computer program product for load balancing between DHCP servers at a DHCP client. The method, system and computer program product include receiving load information from each of two or more DHCP servers. The load information describes a current workload of the respective DHCP server from which the load information is received. Additionally, the method, system and computer program product include selecting, at the DHCP client, one of the two or more DHCP servers to accept an offer for an IP address from, based on the received load information. The method, system and computer program product also include accepting an IP address offer from the selected DHCP server.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein generally relate to techniques for load balancing between DHCP servers at a DHCP client. Embodiments receive load information from each of two or more DHCP servers. Generally, the load information describes a current workload of the respective DHCP server from which the load information is received. For instance, the load information could specify how many IP addresses the respective DHCP server has leased out and a total number of IP addresses the respective DHCP server is configured to lease out. Embodiments then select one of the two or more DHCP servers at the DHCP client based on the received load information. Once the DHCP server is selected, embodiments accept an IP address offer from the selected DHCP server. As a general note, the logic implementing embodiments described herein may reside on the DHCP client. In one embodiment, the logic resides on a DHCP relay agent for the subnet on which the DHCP client is located. Such an embodiment may be advantageous, as it provides load balancing capabilities between the DHCP servers without requiring any additional functionality or configuration from the DHCP client. Advantageously, embodiments provides load balancing capabilities for the DHCP servers without requiring the DHCP servers to communicate and to coordinate with one another.

Figure 1:
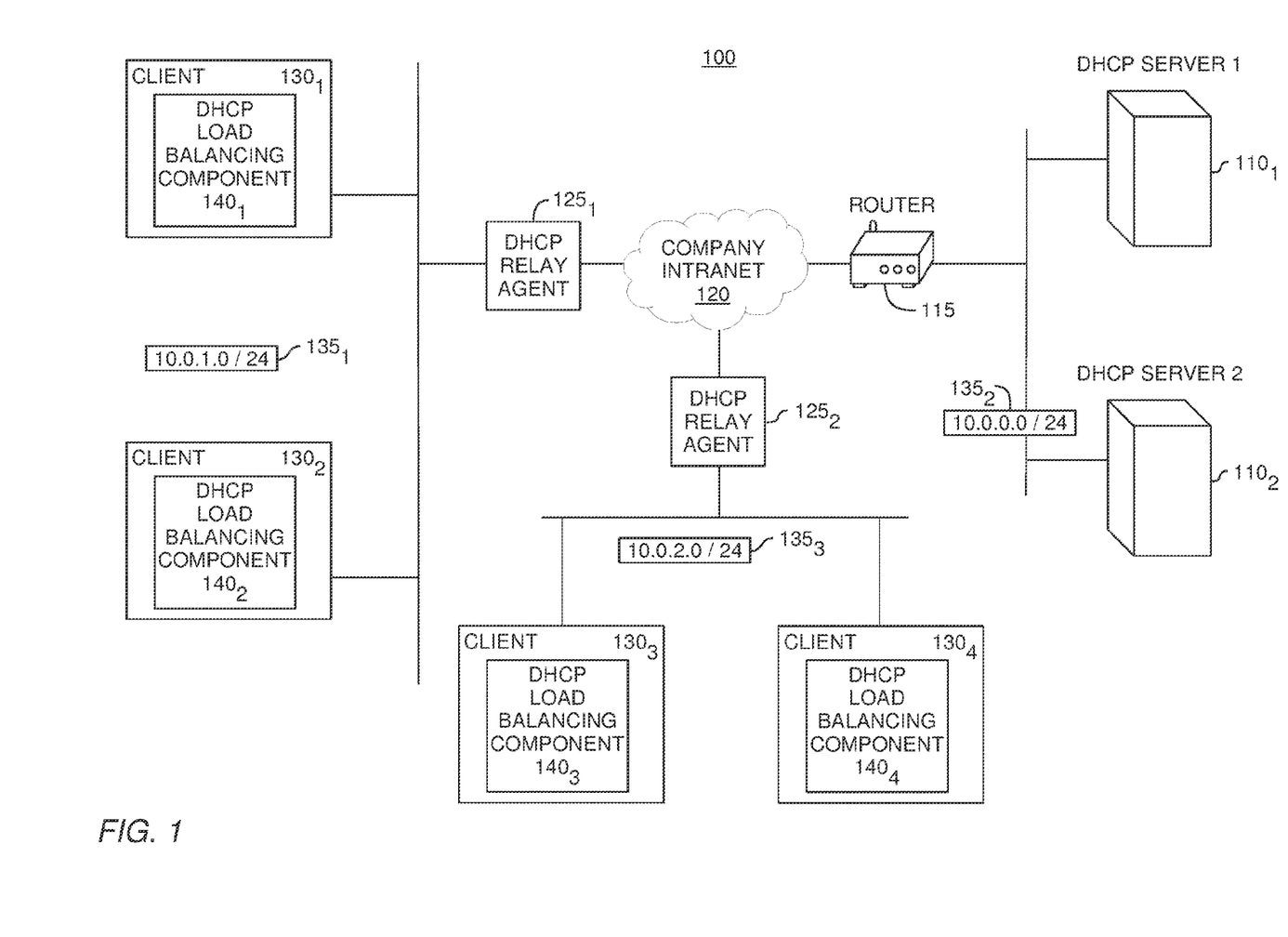
FIG. 1 is a diagram illustrating a system configured with a DHCP load balancing component, according to one embodiment described herein.

FIG. 1 is a diagram illustrating a system configured with a DHCP load balancing component, according to one embodiment described herein. As shown, the system 100 includes a plurality of DHCP clients $130_{1-4}$ located across two subnets $135_{1,3}$. Thus, in the depicted example, the DHCP clients $130_{1-2}$ are located on the subnet $135_1$ of 10.0.1.0/24 and the DHCP clients $130_{3-4}$ are located on the subnet $135_2$ of 10.0.2.0/24. The DHCP clients $135_{1-4}$ on the subnets $135_{1,3}$ are connected to a company intranetwork 120 via DHCP relay agents $125_{1-2}$. Additionally, a plurality of DHCP servers $110_{1-2}$ are shown as located on a third subnet $135_2$ of 10.0.0.0/24. The DHCP servers $110_{1-2}$ are connected to the company intranet 120 via a router 115.

Of note, in the depicted embodiment, the DHCP clients $130_{1-4}$ are located on different subnets from the DHCP servers $110_{1-2}$. As such, the DHCP clients $130_{1-4}$ may be unable to communicate directly with the DHCP servers $110_{1-2}$ in order to obtain leases on IP addresses. To accommodate for this, the DHCP relay agents $125_{1-2}$ are configured to relay DHCP-related traffic from devices on a first subnet to devices on a second, different subnet. For instance, the DHCP relay agents $125_{1-2}$ could be software that executes on a network device such as a router.

In the depicted embodiment, each of the clients $130_{1-4}$ is configured with a corresponding DHCP load balancing component $140_{1-4}$. Generally, the DHCP load balancing components $140_{1-4}$ are configured to select one of the DHCP servers $110_{1-2}$ to obtain an IP address from based on a current load of the DHCP servers $110_{1-2}$. For instance, the DHCP load balancing component $140_1$ on the client $130_1$ could be configured to transmit a request for an IP address to each of the DHCP servers $110_{1-2}$. In response to the request, the DHCP servers $110_{1-2}$ could be configured to transmit workload information describing a current workload of the respective DHCP server $110_{1-2}$ to the DHCP load balancing component $140_1$. For example, the workload information from the DHCP server $110_1$ could indicate a current number of IP addresses the DHCP server $110_1$ is leasing out to clients and a total number of IP address that the DHCP server $110_1$ can potentially lease out. The DHCP load balancing component $140_1$ could then select one of the DHCP servers $110_{1-2}$ from which to obtain an IP address based on the workload information received from each of the DHCP servers $110_{1-2}$. Doing so provides load balancing between the DHCP servers $110_{1-2}$ without requiring communication or coordination between the DHCP servers $110_{1-2}$. Such functionality may be particular advantageous, for instance, when the DHCP servers $110_{1-2}$ are unable to communicate with one another (e.g., in a configuration where the DHCP servers $110_{1-2}$ are located within different subnets).

Figure 2:
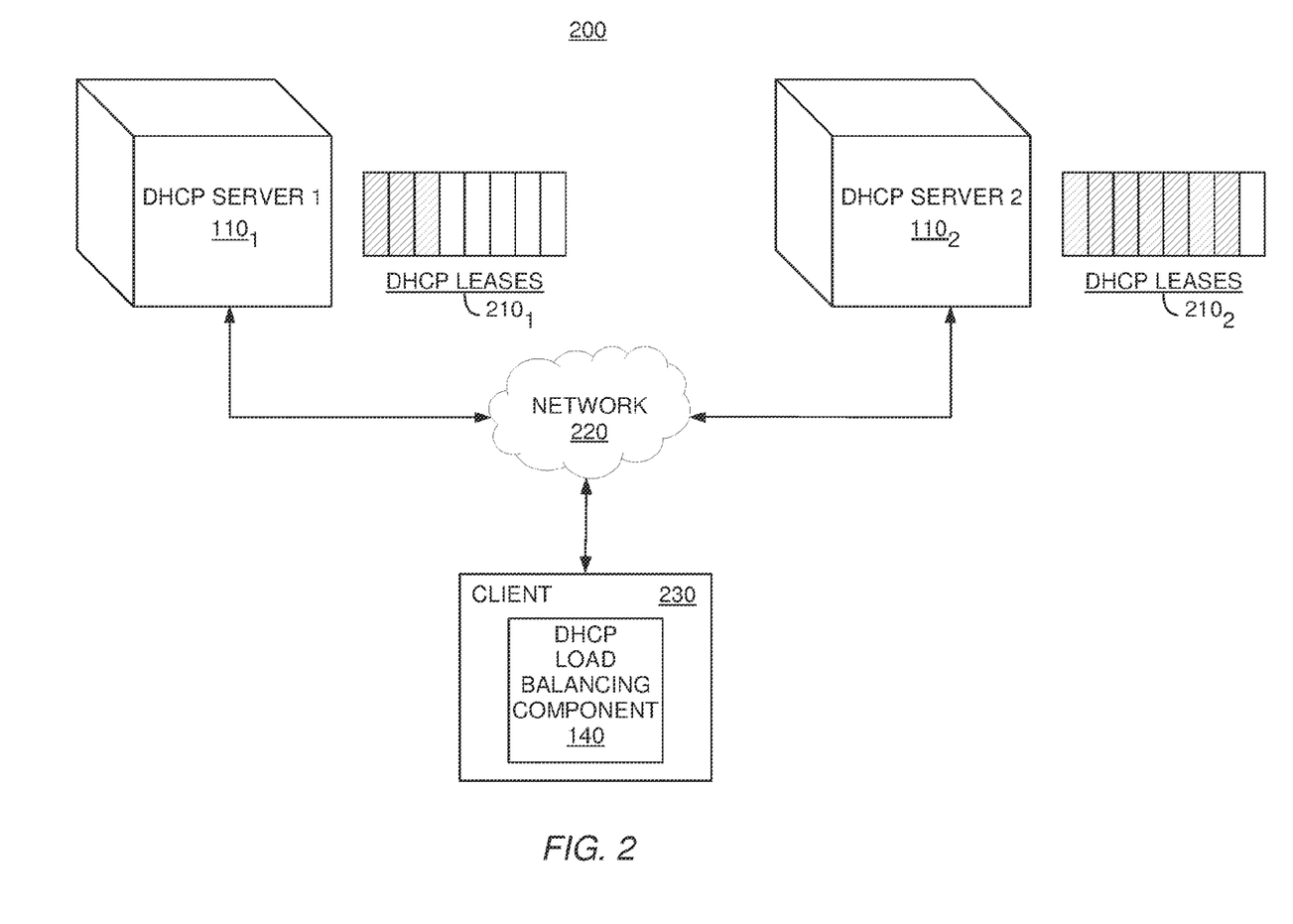
FIG. 2 is a diagram illustrating a system configured with a DHCP load balancing component, according to one embodiment described herein.

An example of this is now discussed with respect to FIG. 2, which is a diagram illustrating a system configured with a DHCP load balancing component, according to one embodiment described herein. As shown, the system 200 includes two DHCP servers $110_{1-2}$ connected to a client system 230 via a network 220. Additionally, the client 230 is configured with a DHCP load balancing component 140. As discussed above, the DHCP load balancing component 140 is generally configured to select one of the DHCP servers $110_{1-2}$ to obtain an IP address from based on the workload of each of the DHCP servers $110_{1-2}$.

For instance, the DHCP load balancing component 140 could transmit a request for an IP address to each of the DHCP servers $110_{1-2}$. As an example, the DHCP load balancing component 140 could broadcast a DHCPDISCOVER message requesting an IP address from one of the DHCP servers. In response, each of the DHCP servers $110_{1-2}$ could transmit workload information to the DHCP load balancing component 140. Additionally, the workload $210_{1-2}$ for each of the DHCP servers $110_{1-2}$ with respect to how many of its IP addresses each of the DHCP servers $1101_{1-2}$ is currently leasing is also depicted in FIG. 2. As shown, the workload $210_1$ for the DHCP server $110_1$ shows that the DHCP server $110_1$ has currently leased out less than half of its total number of IP addresses, while the workload $210_2$ indicates that the DHCP server $110_2$ is currently leasing almost all of its total number of IP addresses.

Upon receiving the workload information from each of the DHCP servers $110_{1-2}$, the DHCP load balancing component 140 could use the received workload information to select one of the DHCP servers $110_{1-2}$ to obtain an IP address from. As an example, the DHCP servers $110_{1-2}$ could each transmit a DHCPOFFER message to the DHCP load balancing component 140 that specifies the workload information for the respective DHCP server within the DHCPOFFER message. Upon receiving such a DHCPOFFER message, the DHCP load balancing component 140 could be configured to select the DHCP server $110_{1-2}$ with the highest number of available IP addresses for lease.

In one embodiment, the DHCP load balancing component 140 is configured to select the DHCP server $110_{1-2}$ with the smallest percentage of existing IP address leases. For example, assume that the DHCP server $110_1$ is configured to assign IP addresses in the range of 192.168.0.1 through 192.168.0.199, while the DHCP server $110_2$ is configured to assign IP addresses in the range of 192.168.0.200 through 192.168.0.250. In such an example, if the DHCP server $110_1$ is currently leasing 100 IP addresses out to clients and the DHCP server $110_2$ is currently leasing 50 IP addresses out to clients, the DHCP load balancing component 140 could select the DHCP server $110_1$ even though it is currently leasing out more IP addresses than the DHCP server $110_2$. That is, in this example, the DHCP server $110_1$ is leasing out approximately half of its available IP addresses, while the DHCP server $110_2$ is leasing out almost the entirety of its available IP addresses. Accordingly, the DHCP load balancing component 140 could select the DHCP server $110_1$ as the server that is leasing out the smallest percentage of available IP addresses.

Once a server is selected, the DHCP load balancing component 140 may accept the offer for an IP address from the selected DHCP server. For example, if the DHCP load balancing component 140 selects the DHCP server $110_1$, the DHCP load balancing component 140 could transmit a DHCPREQUEST message specifying the DHCP server $110_1$. By doing this, embodiments may provide client-side load balancing services for a plurality of DHCP servers. As discussed above, this may be particularly advantageous in an environment where the DHCP servers are unable to communicate with one another (e.g., when the DHCP servers are located within different subnets).

Figure 3:
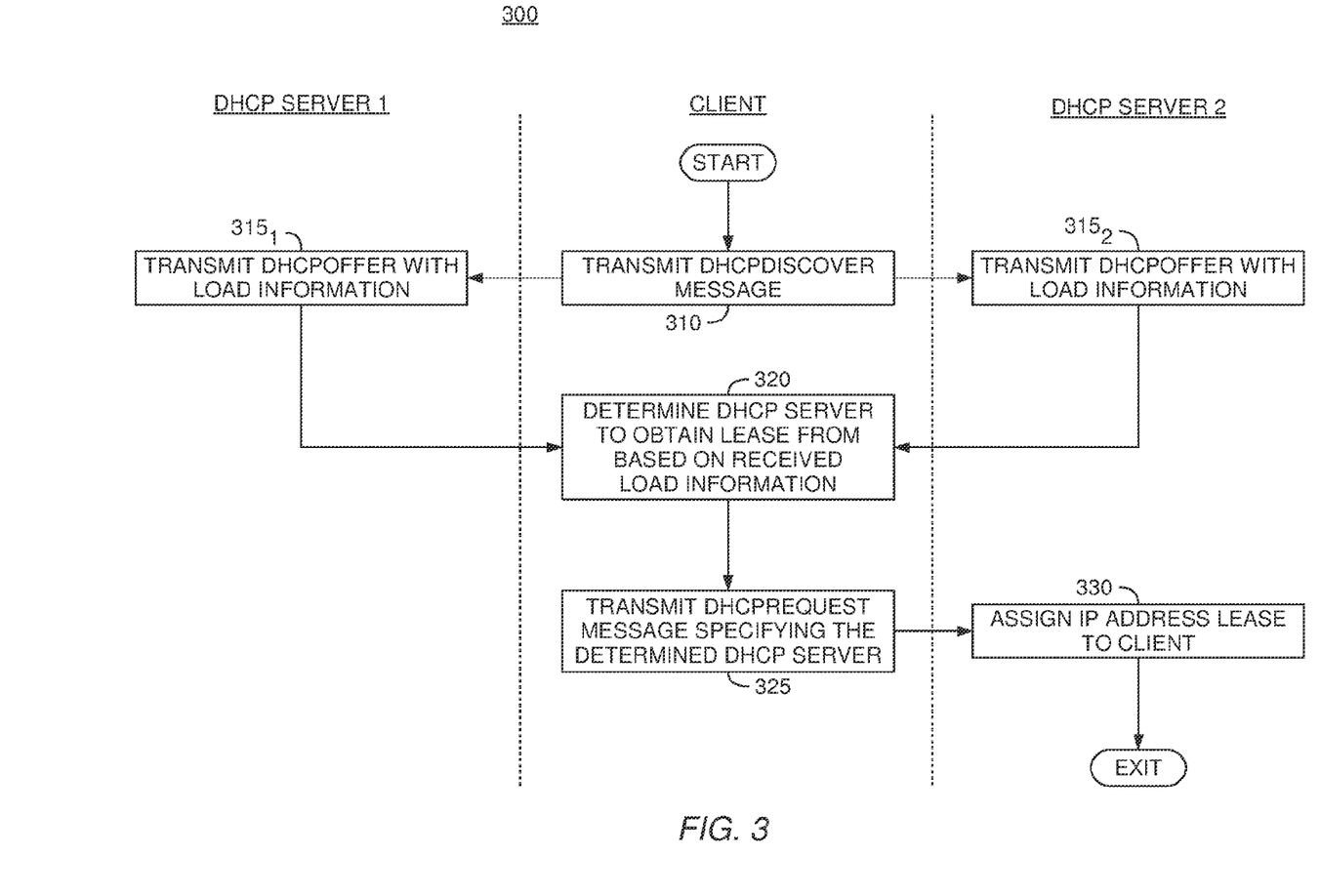
FIG. 3 is a flow diagram illustrating a method for load balancing by a DHCP client, according to one embodiment described herein.

FIG. 3 is a flow diagram illustrating a method for load balancing by a DHCP client, according to one embodiment described herein. As a note, although FIG. 3 pertains to an environment configured with two DHCP servers, it is broadly contemplated that embodiments of the present invention may be configured to provide load balancing services for any environment having two or more DHCP servers. As shown, the method 300 begins at step 310, where a client device configured with a DHCP load balancing component 140 broadcasts a DHCPDISCOVER message requesting offers for IP addresses. Upon receiving the DHCPDISCOVER message, the DHCP servers transmit a DHCPOFFER message that includes load information describing the workload of the respective DHCP server (step $315_{1-2}$). For instance, such load information could be specified in the variable-length Options portion of the DHCPOFFER message.

Once the DHCP load balancing component 140 receives the DHCPOFFER messages from each of the DHCP servers, the DHCP load balancing component 140 determines which DHCP server to obtain an IP address from based on the received load information (step 320).

In the depicted example, the DHCP load balancing component 140 selects the DHCP Server 2 to obtain an IP address from. The DHCP load balancing component 140 then transmits a DHCPREQUEST message specifying the selected DHCP server (step 325). Upon receiving the DHCPREQUEST message, the DHCP Server 2 assigns a lease of the IP address to the client (step 330) and the method 300 ends. Advantageously, by providing load balancing functionality between DHCP servers on the client side, embodiments can be provide load balancing capabilities without requiring interaction between the DHCP servers. This may be particular advantageous in environments where the DHCP servers are unable to communicate directly with one another (e.g., environments where the DHCP servers are located on different subnets).

Figure 4:
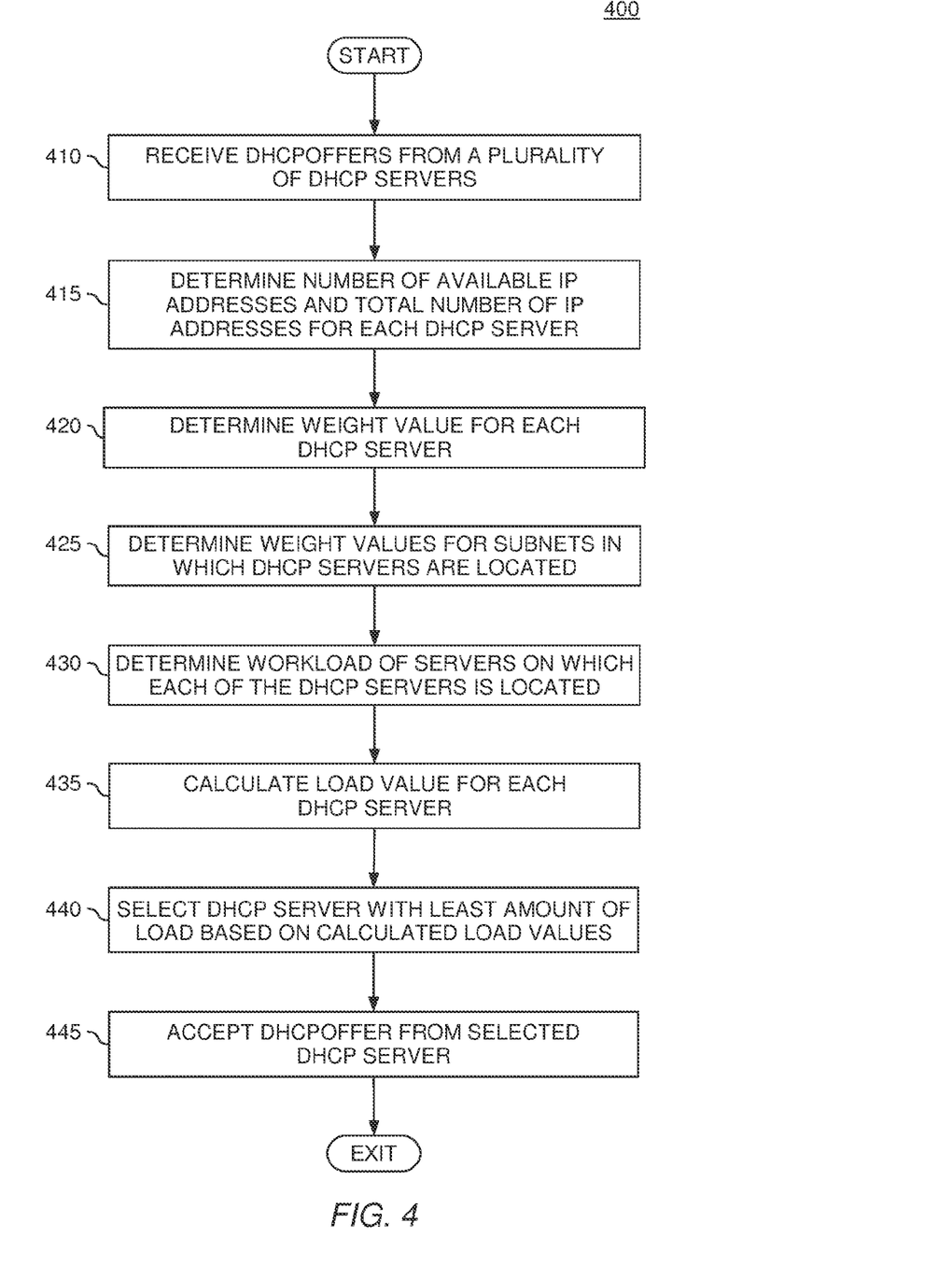
FIG. 4 is a flow diagram illustrating a method for load balancing by a DHCP client, according to one embodiment described herein.

FIG. 4 is a flow diagram illustrating a method for load balancing by a DHCP client, according to one embodiment described herein. As shown, the method 400 begins at step 410, where the DHCP load balancing component 140 receives DHCPOFFER messages from a plurality of DHCP servers. The DHCP load balancing component 140 then determines, for each of the IP addresses, a number of available IP addresses the DHCP server can lease and a total number of IP addresses that the DHCP server is configured to lease (step 415). For example, the DHCP load balancing component 140 could retrieve such information from the Options section of the DHCPOFFER messages received from each of the DHCP servers.

Additionally, the DHCP load balancing component 140 determines a weight value associated with each of the DHCP servers (step 420). That is, in the depicted embodiment, the DHCP load balancing component 140 is configured to consider a weight for each of the DHCP servers, allowing the DHCP load balancing component 140 to be configured to give a preference to particular ones of the DHCP servers in selecting which DHCP server to accept an IP address from. Furthermore, the DHCP load balancing component 140 in the depicted examples determines a weight value for the subnet in which each of the DHCP servers are located (step 425). Thus, similar to the weight for each of the DHCP servers, the DHCP load balancing component 140 in the depicted embodiment considers a weight for each of the subnets in which the DHCP servers reside, allowing the DHCP load balancing component 140 to be configured to give a preference to particular subnets in selecting one of the DHCP servers to accept an IP address from.

The DHCP load balancing component 140 further determines a system workload of the servers on which each of the DHCP servers is located (step 430). Such system workload information could include, for example, a CPU load of the computer system, historical CPU load of the computer system, network load of the computer system, historical network load of the computer system, and a response time of the computer system. More generally, any measurement or indicator of the workload of the DHCP servers can be used.

The DHCP load balancing component 140 then calculates a load value for each of the DHCP servers (step 435). For instance, in one embodiment, the DHCP load balancing component 140 is configured to calculate a weighted score using the determined factors and any corresponding weights. In calculating such a score, the DHCP load balancing component 140 could assign various weights to the various factors. For instance, the DHCP load balancing component 140 could be configured to calculate a percentage of available IP addresses for each of the available DHCP servers and to consider the calculated percentage as the most relevant factor in the load value. Additionally, the DHCP load balancing component 140 could consider the current workload of the computer systems the DHCP servers are located on as a less relevant factor in calculating the load value.

The load value may further be adjusted based on the determined weights associated with the DHCP servers and/or subnets in which the DHCP servers are located. For example, a first DHCP server could be associated with a stronger weight, giving a stronger preference to the first DHCP server, while a second DHCP server could be associated with a weaker weight, giving less of a preference to the second DHCP server when the DHCP load balancing component 140 is selecting a server to accept an IP address from. In such an example, the DHCP load balancing component 140 could adjust the load value calculated for the first DHCP server to make it more likely that the DHCP load balancing component 140 will selected the first DHCP server. For instance, in an embodiment where a higher load value indicates that the respective DHCP server has a higher workload and is less suitable for accepting an IP address from, the DHCP load balancing component 140 could be configured to adjust the load value downwards if the DHCP server is associated with a stronger weight, indicating a preference for the DHCP server. As another example, in an embodiment where a higher load value indicates that the respective DHCP server is more suitable for accepting an IP address from, the DHCP load balancing component 140 could be configured to adjust the load value upwards if the DHCP server is associated with a stronger weight, indicating a preference for the DHCP server. The weights associated with the subnets in which the DHCP servers are located could be applied in a similar fashion. In another embodiment, the DHCP clients are also be configured to have an affinity to one or more of the DHCP servers. In such an embodiment, each DHCP server could return an affinity identifier in the DHCPOFFER to enable the load balancing component to select the DHCP server with a matching affinity identifier. Advantageously, doing so enables the DHCP clients to be configured with a preference for particular ones of the DHCP servers.

Once the load values are calculated for all of the DHCP servers, the DHCP load balancing component 140 selects one of the DHCP servers to obtain an IP address from (step 440). For example, in an embodiment where a higher load value indicates that the corresponding DHCP server is more suitable, the DHCP load balancing component 140 could select the DHCP server with the highest load value. In another embodiment where a lower load value score is used to indicate the corresponding DHCP server is more suitable, the DHCP load balancing component 140 could select the DHCP server having the lowest load value. The DHCP load balancing component 140 then accepts the offer of an IP address from the selected DHCP server (step 445). As an example, the DHCP load balancing component 140 could be configured to transmit a DHCPREQUEST message specifying the selected DHCP server. Once the offer is accepted, the method 400 ends.

Figure 5:
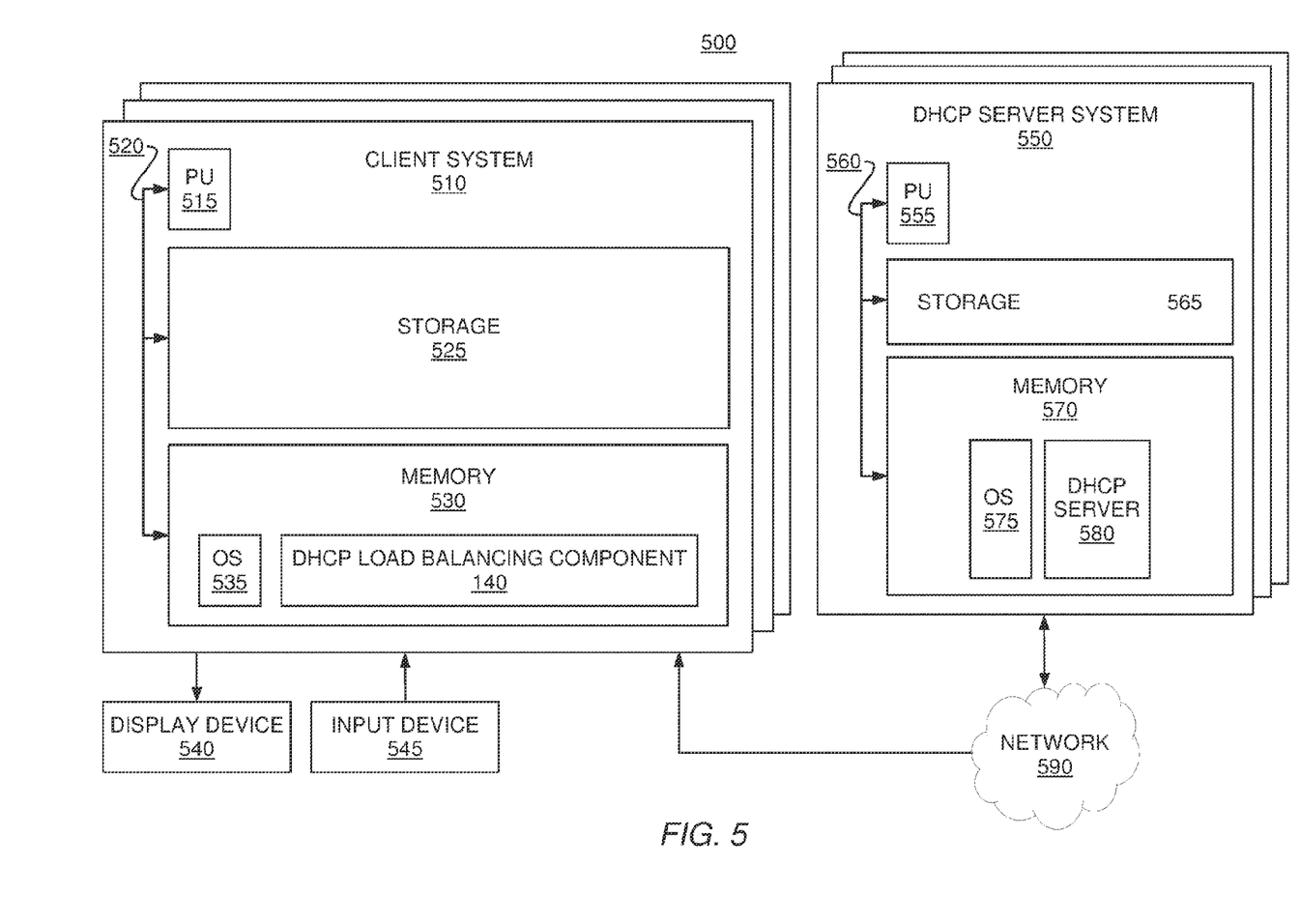
FIG. 5 is a block diagram illustrating a system configured with a DHCP load balancing component, according to one embodiment described herein.

FIG. 5 is a block diagram illustrating a system configured with a DHCP load balancing component, according to one embodiment described herein. As shown, the system 500 includes a plurality of client systems 510 and a plurality of DHCP server systems 550, communicatively coupled via a network 590. In one embodiment, the client systems 510 may include existing computer systems, e.g., desktop computers, server computers, laptop computers, tablet computers, mobile devices (e.g., mobile phones), gaming consoles, handheld gaming devices and the like. The client systems 510 illustrated in FIG. 5, however, are merely examples of computer systems in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, each client system 510 includes, without limitation, a processor 515, which obtains instructions and data via a bus 520 from a memory 530 and storage 525. Processor 515 is a programmable logic device that performs instruction, logic, and mathematical processing, and may be representative of one or more CPUs. Storage 525 is representative of hard-disk drives, flash memory devices, optical media and the like. Generally, the storage 525 stores application programs and data for use by the client system 510. The client systems 510 are operably connected to the network 590, e.g., via network interfaces.

The memory 530 is any memory sufficiently large to hold the necessary programs and data structures. Memory 530 could be one or a combination of memory devices, including Random Access Memory, nonvolatile or backup memory (e.g., programmable or Flash memories, read-only memories, etc.). In addition, memory 530 and storage 525 may be considered to include memory physically located elsewhere; for example, on another computer coupled to the client system 510 via bus 520. The memory 530 includes a DHCP load balancing component 140 and an operating system ("OS") 535. Operating system 535 is software used for managing the operation of the client system 510. Examples of OS 535 include UNIX, versions of the Microsoft Windows® operating system and distributions of the Linux® operating system. (Note: Linux is a trademark of Linus Torvalds in the United States and other countries.) More generally, any operating system 535 capable of performing the functions described herein may be used.

Additionally, the client systems 510 are each coupled to display devices 540 and input devices 545. The display devices 540 may include output devices such as monitors, touch screen displays, and so on. The input devices 545 represent a wide variety of input devices, including keyboards, mice, controllers, microphones, and so on.

As shown, the DHCP server system 550 includes, without limitation, a processor 555, which obtains instructions and data via a bus 560 from a memory 570 and storage 565. Processor 555 is a programmable logic device that performs instruction, logic, and mathematical processing, and may be representative of one or more CPUs. Storage 565 is representative of hard-disk drives, flash memory devices, optical media and the like. Generally, the storage 565 stores application programs and data for use by the DHCP server system 550. The DHCP server system 550 is operably connected to the network 590, e.g., via a network interface.

The memory 570 is any memory sufficiently large to hold the necessary programs and data structures. Memory 570 could be one or a combination of memory devices, including Random Access Memory, nonvolatile or backup memory (e.g., programmable or Flash memories, read-only memories, etc.). In addition, memory 570 and storage 565 may be considered to include memory physically located elsewhere; for example, on another computer coupled to the DHCP server system 550 via bus 560. The memory 570 includes a DHCP server application 580 and an OS 575. Operating system 575 is software used for managing the operation of the DHCP server system 550. Examples of OS 575 include UNIX, versions of the Microsoft Windows® operating system and distributions of the Linux® operating system. More generally, any operating system 575 capable of performing the functions described herein may be used.

As discussed above, the DHCP load balancing component 140 is generally configured to receive load information from each of two or more DHCP servers. Here, such load information generally describes a current workload of the corresponding DHCP server. For example, in one embodiment, the load information specifies a total number of IP addresses the corresponding DHCP server is configured to lease out and an available number of IP addresses that the server has not yet leased out. In another embodiment, the workload information specifies a percentage of available IP addresses that the corresponding DHCP server can still lease out. The workload information could also specify a percentage of IP addresses that the corresponding DHCP server has already leased out. Additionally, the workload information can specify information describing a system workload of a computer system on which the corresponding DHCP server is executing. Such system workload information could include CPU usage, memory usage, historical CPU usage, historical memory usage, and so on. Upon receiving the workload information, the DHCP load balancing component 140 is configured to select one of the two or more DHCP servers from which to receive an IP address. The DHCP load balancing component 140 then accepts an offer for an IP address from the selected DHCP server. Advantageously, doing so provides load balancing functionality between a plurality of DHCP servers and does so in a way that does not require the DHCP servers to communicate and/or coordinate with each other.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could submit a database query (e.g., using the database client 640) specifying a new temporal key to be inserted into an index for a database or other data store available in the cloud. For example, a DBMS configured with a temporal key indexing component 150 could execute on a computing system in the cloud and maintain a database index containing temporal keys. Upon receiving the database query specifying the prospective new temporal key, the temporal key indexing component 150 could determine if a conflict exists between the new temporal key and the temporal keys within the index and, if not, could insert the new temporal key into the index. Doing so allows users to submit queries relating to temporal keys from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of load balancing between DHCP servers at a DHCP client, comprising:
   receiving, at the DHCP client, a respective DHCPOFFER message from each of two or more DHCP servers, wherein each of the DHCPOFFER messages includes (i) an IP address offer and (ii) load information comprising a plurality of load characteristics describing a current workload of the respective DHCP server, and wherein at least two of the two or more DHCP servers are located on different subnets with respect to one another;
   associating a respective weight value with each of the different subnets on which the DHCP servers are located;
   selecting, at the DHCP client, one of the two or more DHCP servers to accept an offer for an IP address from, based on the received load information, comprising:
      retrieving a weight associated with each of the plurality of load characteristics;
      calculating a load value for each of the two or more DHCP servers by applying the retrieved weight to each of the plurality of load characteristics for the respective DHCP server, and based on the associated weight value for the subnet in which the respective DHCP server is located; and
      selecting the DHCP server with the least amount of load based on the calculated load values; and
   transmitting a DHCPREQUEST message, from the DHCP client, to the selected DHCP server, to accept the IP address offer from the selected DHCP server.

2. The method of claim 1, wherein the load information specifies at least one of (i) a percentage of IP available addresses that the respective DHCP server has leased and (ii) a total number of available IP addresses and a leased number of IP addresses.

3. The method of claim 1, wherein the load information specifies one or more workload characteristics of a computer system on which the DHCP server is located, wherein the one or more workload characters include at least one of a CPU load of the computer system, historical CPU load of the computer system, network load of the computer system, historical network load of the computer system, and a response time of the computer system.

4. The method of claim 1, further comprising:
   identifying a plurality of DHCP servers capable of leasing an IP address to the DHCP client, wherein the plurality of DHCP servers includes the two or more DHCP servers;
   transmitting a request for an IP address to each of the identified plurality of DHCP servers; and
   receiving the respective DHCPOFFER messages from the two or more DHCP servers, wherein the two or more DHCP servers are the DHCP servers within the plurality of DHCP servers that responded to the transmitted requested within a predefined period of time.

5. The method of claim 1, further comprising:
   associating a respective weight value with each of the two or more DHCP servers, and
   wherein the calculated load value for each of the two or more DHCP servers is further based on the associated weight value for the respective DHCP server.

6. The method of claim 1, further comprising:
   associating a respective affinity value with each of the two or more DHCP servers,
   wherein the calculated load value for each of the two or more DHCP servers is further based on the affinity value associated with the DHCP server matching a preconfigured affinity value for the DHCP client.

7. The method of claim 1, wherein the load information is specified within an options field of the respective DHCPOFFER message.

* * * * *